(12) United States Patent
Zhao et al.

(10) Patent No.: US 10,301,919 B2
(45) Date of Patent: May 28, 2019

(54) PHASE-CHANGE HYDRAULIC FRACTURING PROCESS

(71) Applicants: SOUTHWEST PETROLEUM UNIVERSITY, Sichuan (CN); PETROCHINA HUABEI OILFIELD COMPANY, Hebei (CN)

(72) Inventors: Liqiang Zhao, Chengdu (CN); Yong Yang, Cangzhou (CN); Zhifeng Luo, Chengdu (CN); Donghe Yu, Cangzhou (CN); Juan Du, Chengdu (CN); Guohua Liu, Cangzhou (CN); Hang Che, Cangzhou (CN); Guangyan Du, Chengdu (CN); Yuxin Pei, Chengdu (CN); Nianyin Li, Chengdu (CN); Pingli Liu, Chengdu (CN); Kun Xu, Chengdu (CN); Bingxiao Liu, Cangzhou (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 15/775,384

(22) PCT Filed: Sep. 20, 2016

(86) PCT No.: PCT/CN2016/099424
§ 371 (c)(1),
(2) Date: May 10, 2018

(87) PCT Pub. No.: WO2018/006497
PCT Pub. Date: Jan. 11, 2018

(65) Prior Publication Data
US 2019/0003294 A1    Jan. 3, 2019

(30) Foreign Application Priority Data

Jul. 7, 2016 (CN) .......................... 2016 1 0531410

(51) Int. Cl.
*E21B 43/26* (2006.01)
*C09K 8/60* (2006.01)
(Continued)

(52) U.S. Cl.
CPC .............. *E21B 43/26* (2013.01); *C09K 8/604* (2013.01); *C09K 8/665* (2013.01); *C09K 8/68* (2013.01); *C09K 8/70* (2013.01); *C09K 2208/30* (2013.01)

(58) Field of Classification Search
None
See application file for complete search history.

(56) References Cited

U.S. PATENT DOCUMENTS 4,892,147 A * 1/1990 Jennings, Jr. ............ C09K 8/62
166/271
5,900,451 A * 5/1999 Krishnan ............... C08F 236/04
524/459

(Continued)

FOREIGN PATENT DOCUMENTS

CN   101027376 A   8/2007
CN   101371005 A   2/2009

(Continued)

*Primary Examiner* — Anuradha Ahuja
(74) *Attorney, Agent, or Firm* — Gokalp Bayramoglu

(57) ABSTRACT

A phase-change hydraulic fracturing process, including the following steps: (1) injecting clean water or conventional fracturing fluid to a formation, so that the formation fractures; (2) placing non-phase-change liquid and phase-change liquid in different liquid mixing tanks and injecting into a shaft at the same time, an injection volume ratio of the non-phase-change liquid to the phase-change liquid is (0-0.7):(0.3-1); (3) injecting a displacement fluid into the shaft, so that the non-phase-change liquid and the phase-change liquid in the shaft completely enter a reservoir; (4) performing well shut-in and pressure-out for 30-200 min, so (Continued)

that solid-phase matters generated by the phase-change liquid are laid in the fracture; and (5) relieving pressure to finish the construction.

7 Claims, 1 Drawing Sheet

(51) Int. Cl.
*C09K 8/66* (2006.01)
*C09K 8/68* (2006.01)
*C09K 8/70* (2006.01)

(56) References Cited

U.S. PATENT DOCUMENTS

| | | | |
|---|---|---|---|
| 6,509,300 B1 | 1/2003 | Gupta | |
| 2006/0234871 A1* | 10/2006 | Dalrymple | C09K 8/428 |
| | | | 507/211 |
| 2010/0307755 A1* | 12/2010 | Xu | E21B 43/26 |
| | | | 166/308.1 |
| 2014/0083702 A1* | 3/2014 | Godfrey | C09K 8/422 |
| | | | 166/295 |
| 2016/0003022 A1* | 1/2016 | Rothrock | E21B 43/267 |
| | | | 166/280.2 |

FOREIGN PATENT DOCUMENTS

| | | |
|---|---|---|
| CN | 104265354 A | 1/2015 |
| CN | 105134284 A | 12/2015 |

\* cited by examiner

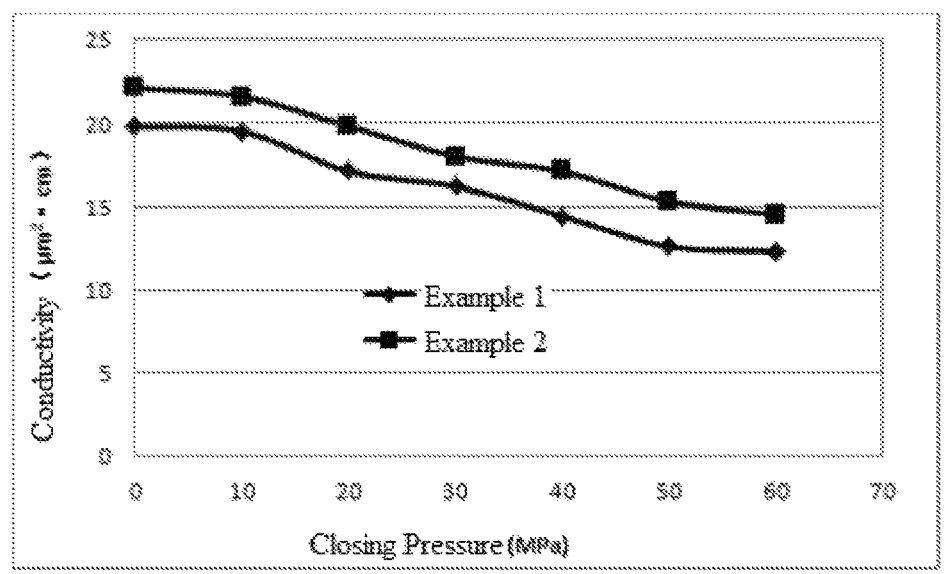

PHASE-CHANGE HYDRAULIC FRACTURING PROCESS

CROSS REFERENCE TO RELATED APPLICATIONS

This application is the national phase entry of International Application PCT/CN2016/099424, filed on Sep. 20, 2016, which is based upon and claims priority to Chinese Patent Application No. 201610531410.8, filed on Jul. 7, 2016, the entire contents of which are incorporated herein by reference.

TECHNICAL FIELD

The present invention relates to a hydraulic fracturing stimulation technology for reservoirs in the process of petroleum development, in particular to a phase-change hydraulic fracturing process.

BACKGROUND

The hydraulic fracturing technology has been widely used in the development of low-permeability oil and gas fields as a major measure for increasing production of oil and gas wells and augmented injection of water wells, and has made important contributions to stable production of oil and gas fields. The hydraulic fracturing process refers to pumping high-viscosity pre-flush fluid into a target reservoir, forming fractures at high pressure and extending the fractures, and then pumping sand-carrying fluid mixed with a proppant, wherein the sand-carrying fluid can continue to extend the fractures, and at the same time carry the proppant deep into the fractures; and finally, enabling the fracturing fluid to break and degrade into low-viscosity fluid which then flow to the bottom of the well and later flows back, thereby leaving a flow channel with high conductivity formed by the proppant supporting the fracture wall in the formation to facilitate flowing of oil and gas from the far-field formation to the bottom of the well.

Since the 1st hydraulic fracturing in the United States in 1947, after more than 60 years of development, the hydraulic fracturing technology has achieved an amazing development from theoretical research to field practice. For example, a fracture extending model has developed from two-dimension to pseudo-three-dimension and full three-dimension; a dynamic prediction model of a fractured well has developed from an electric simulation chart and a steady state flow model to a three-dimensional and three-phase unsteady model; the fracturing fluid has developed from crude oil and clean water to low-, medium-, and high-temperature series of high-quality, low-damage, delayed-crosslinking guar gum organoboron "double-variable" fracturing fluid systems and clean fracturing fluid systems; a proppant has developed from natural quartz sand to medium- and high-strength man-made ceramsites; fracturing equipment has developed from a low-power cement truck to a 1000, 2000, or 2500 fracturing truck; the single-well fracturing construction has developed from small-scale, low sand-to-liquid ratio to ultra-large, high-sand-fluid ratio fracturing operations; the field of fracturing applications has developed from specific low-permeability oil and gas reservoirs to simultaneous development of ultra-low-permeability and medium- and high-permeability oil and gas reservoirs (and sometimes sand-control fracturing).

However, from the point of view of the hydraulic fracturing technology and its development, all fracturing technologies are currently based on the process of forming fractures with a fracturing fluid, then injecting a solid proppant to hydraulic fractures, and supporting the fractures to keep them open, thereby obtaining a flow channel with high conductivity.

In 2010, Schlumberger proposed that the fracture conductivity in a HIWAY high-speed channel was not affected by the permeability of a proppant, and oil and gas do not pass through a proppant pack but instead flows through a high-conductivity channel. However, its implementation requires strict requirements on a perforating process, a pump injection process, and pump injection equipment. The construction cost is high and the process is complicated. It is also necessary to inject a proppant into the formation to open fractures.

The conventional guar gum fracturing fluid system and sand fracturing generally have the following problems:

(1) if the fracturing fluid is not thoroughly broken and returned, it will seriously injure the conductivity of artificial fractures and reduce the matrix permeability near the fractures;

(2) with respect to high temperature deep wells, in order to maintain the sand carrying capacity of the fracturing fluid at high temperature, the concentration of additives such as guar gum and crosslinker is increased, resulting in further increase of the residue content, further increase of frictional resistance, and further occurrence of the problems, such as gum breakage and flowback;

(3) for sand fracturing, in order to pursue high conductivity, sand is introduced at a high sand ratio, which can easily lead to sand plugging and other accidents;

(4) with the increase of production time after construction, problems such as embedding, deformation, and backflow of conventional proppants such as ceramsite and quartz sand will result in a significant decrease in post-pressure conductivity, and the construction validity will be greatly shortened.

The above problems often lead to a significant reduction in fracture conductivity. Therefore, the fracture permeability measured after post-pressure well testing can only reach one-tenth or even one-hundredth of the permeability in a laboratory.

In order to effectively improve the post-pressure permeability, reduce the reservoir damage caused by the fracturing fluid, and improve the overall fracturing effect, the present invention proposes a phase-change hydraulic fracturing process in which a phase-change fracturing fluid forms a solid support by means of its own phase-change, and a non-phase-change fracturing fluid injected together with the phase-change fracturing fluid flows back after the fracturing is completed to keep out of the space within the fracture to form an oil and gas seepage flow, such that the fracture permeability is greatly improved.

SUMMARY

Technical Problems

The present invention aims to provides a phase-change hydraulic fracturing process, which can form channels and ditches for underground oil gas seepage using a solid-free composite fracturing fluid system, without a solid proppant, such that a conductivity of a hydraulically fractured fracture is greatly improved, and the process is simple, safe and efficient in construction operation.

Technical Solution

To full the above technical objective, the present invention provides the following technical solution.

A phase-change hydraulic fracturing process comprises the following steps:

(1) injecting a fracturing fluid agent A into the formation by a high-pressure hydraulic pump truck under a pressure higher than a formation fracture pressure, such that the formation fractures, and shutting off the pump after the generated fracture reaches a fracture geometric size required by the design;

(2) placing a non-phase-change liquid M and a phase-change liquid N in different liquid mixing tanks respectively in a construction site, then connecting a three-way pipeline at a wellhead, and injecting the non-phase-change liquid M and the phase-change liquid N to a shaft at the same time, wherein an injection volume ratio of the liquid M to the liquid N is (0-0.7):(0.3-1); the non-phase-change liquid M and the phase-change liquid N injected into the formation undergo chemical and physical actions under a reservoir temperature to be converted from a liquid phase to a solid phase to support the fracture, and the total injection amount of the non-phase-change liquid M and the phase-change liquid N is calculated based on the geometric volume of the fracture design;

(3) injecting a displacement fluid into the shaft, so that the non-phase-change liquid M and the phase-change liquid N in the shaft completely enter a reservoir, and then shutting off the pump, and performing well shut-inf and pressure-out, wherein the displacement fluid is diesel, gasoline or 3 mass % ammonium chloride solution, or 3 mass % potassium chloride solution;

(4) performing well shut-in and pressure-out for 30-200 min, such that solid matters generated by the phase-change liquid N are laid in the fracture (rather than being extruded out of the formation by the closure of the fracture under an uncompleted reaction state); and (5) relieving pressure to finish the construction.

The agent A in the present invention is clear water or a conventional fracturing fluid, wherein the conventional fracturing fluid is a guar gum fracturing fluid, a cellulose fracturing fluid, or a polyacrylamide fracturing fluid.

The liquid M in the present invention is a conventional fracturing fluid, seawater, formation water, or ground fresh water.

The liquid N in the present invention comprises the following components in percentage by weight: 10%-40% of supramolecular construction unit, 0-40% of supramolecular function unit, 0.5%-2% of surfactant, 0-5% of inorganic salt, 0.5%-2% of oxidizing agent, 0-2% of cosolvent and the balance of solvent; the supramolecular construction unit is melamine, triallyl isocyanurate, or a mixture thereof; the supramolecular function unit is vinyl acetate, acrylonitrile, or a mixture thereof.

The surfactant is one or more of sodium dodecylbenzenesulfonate, Tween 20, Tween 40, and cetyl trimethylammonium bromide.

The inorganic salt is one or more of sodium phosphate, calcium chloride, and magnesium chloride.

The oxidizing agent is hydrogen peroxide, ammonium persulfate, or sodium dichromate. The cosolvent is polyethylene glycol, polyvinyl pyrrolidone, or a mixture thereof.

The solvent is toluene, ethylbenzene, o-xylene, m-xylene or p-xylene.

During the construction process, the liquid M is not subject to phase change, and the liquid N is a key liquid for realizing the phase-change fracturing process. Only when the liquid N is transformed from a liquid phase to a solid phase underground, the phase-change fracturing process is successful.

The phase-change liquid and the non-phase-change liquid are injected into the formation at the same time. After the phase-change liquid is subjected to phase change to form a solid phase, it will support the fracture in place, while the non-phase-change material can continue to flow. Therefore, after the construction is completed, certain flow channel may be formed in the formation, thereby realizing high conductivity of the fracturing process.

The invention proposes a brand-new hydraulic fracturing process measure—solid-free self-supporting phase-change fracturing technology, which is suitable for the transformation in fracturing, production increase and injection increase of conventional sandstone oil reservoirs, carbonate oil reservoirs, and other complex oil and gas reservoirs. The principle of this technology is as follows: an immiscible composite fracturing fluid system is used to fracture and form an artificial fracture of a certain geometric size, and one or both of fluids in the fracture is allowed to form a number of independent "solid embankments" through physical and chemical methods to support the fracture, thereby forming a high-permeability "channel-type flow channel" to improve the conductivity of the fracture, thereby increasing the yield.

Beneficial Effects

Compared with the prior art, the present invention has the following beneficialeffects:

compared with the conventional hydraulic pressure, the present invention, instead ofinjecting a solid phase proppant into a formation, injects a phase-change fracturing fluid into the fractured formation. The phase-change fracturing fluid is a flowable liquid phase on the ground and in the injection process. Under supra molecular chemical and physical actions, the phase-change fracturing fluid after entering the reservoir forms solid matters to support the fracture. Because there is no injection of solid phase, the friction resistance of a pipe string can be effectively reduced, the requirements for construction equipment, ground pipelines, wellheads and construction pipe string are reduced, and the construction cost is effectively reduced. At the same time, construction risks and potential safety hazards are reduced.

BRIEF DESCRIPTION OF THE DRAWINGS

FIG. 1 is a curve graph of fracture conductivities in Embodiment 1 and Embodiment 2.

DETAILED DESCRIPTION

Embodiments of the Invention

The present invention will be further described below with reference to the accompanying drawings and examples.

Example 1

Taking ground outcrop as an experimental material, indoor experiment simulation is performed by using a core fracture conductivity simulation device.

Firstly, the outcrop is cut into rock plates (8 cm×5 cm×1.75 cm) according to equipment requirements, and the two rock plates are stacked and put into a core holder. The fracturing construction process is simulated, an injection pressure and a confining pressure are changed, and a rock plate fracture conductivity experiment is performed under at a temperature of 90° C. In accordance with "injecting a fracturing fluid agent A→injecting a liquid M and a liquid N from two acid injection tanks at the same time→injecting a displacement fluid to expel the phase-change fracturing fluid in a pipeline to the rock plates→performing pressure-out for 60 min→relieving pressure", a closing pressure is changed, and fracture conductivity variation data is tested. The conductivity of the fracture after being supported by the phase-change material during the phase-change fracturing construction process is simulated, and the initial conductivity measured before the start of a rock plate experiment is 2.6 ($\mu m^2 \cdot cm$).

Inflow fluids used for testing the fracture conductivity are as follows in percentage by weight:

an agent A: conventional fracturing fluid: 1% of guar gum, and 99% of water;

a non-phase-change liquid M and a phase-change liquid N according to a volume ratio of 1:1, wherein M includes 0.5% of guar gum, and 99.5% of water. N includes 50 g of o-xylene, 12 g of melamine, 10 g of vinyl acetate, 2 g of acrylonitrile, 0.5 g of sodium dodecylbenzenesulfonate, 0.5 g of Tween 20, 2 g of sodium phosphate, and 0.5 g of ammonium persulfate; and a displacement fluid: 3% aqueous ammonium chloride solution.

The experimental results are shown in FIG. 1. After the rock plates are subjected to a phase-change fractured fracture conductivity experiment, the conductivity changes from initial 2.6 $\mu m^2 \cdot cm$ to 19.8 $\mu m^2 \cdot cm$, which indicates that the fracture supporting is successful through phase-change fracturing. At the same time, with the increase of a fracture closing pressure, the fracture conductivity has decreased, but it is still many times higher than the initial permeability. When the closing pressure reaches 60 MPa, the fracture conductivity is still 12.3 $\mu m^2 \cdot cm$, which indicates that phase-change fracturing process provided by the present invention can meet the underground high pressure conditions. When the construction is completed, the phase-changed solid material achieves the supporting for the formation fracture.

Example 2

Taking ground outcrop as an experimental material, indoor experiment simulation is performed by using a core fracture conductivity simulation device.

Firstly, the outcrop is cut into rock plates (8 cm×5 cm×1.75 cm) according to equipment requirements, and the two rock plates are stacked and put into a core holder. The fracturing construction process is simulated, an injection pressure and a confining pressure are changed, and a rock plate fracture conductivity experiment is performed at a temperature of 80° C. In accordance with "injecting a fracturing fluid agent A→injecting a liquid M and a liquid N from two acid injection tanks at the same time→injecting a displacement fluid to expel the phase-change fracturing fluid in a pipeline to the rock plates→performing pressure-out for 90 min→relieving pressure", a closing pressure is changed, and fracture conductivity variation data is tested. The conductivity of the fracture after being supported by the phase-change material during the phase-change fracturing construction process is simulated, and the initial conductivity measured before the start of a rock plate experiment is 2.8 ($\mu m^2 \cdot cm$).

Inflow fluids used for testing the fracture conductivity are as follows in percentage by weight:

an agent A: conventional fracturing fluid: 1% of guar gum, and 99% of water;

a non-phase-change liquid M and a phase-change liquid N according to a volume ratio of 1:1, wherein M includes formation water in the Huabei Oil Field. N includes 50 g of ethylbenzene 50 g, 10 g of melamine, 4 g of triallyl isocyanurate, 10 g of acrylonitrile, 0.5 g of sodium dodecylbenzenesulfonate, 0.5 g of cetyltrimethylammonium bromide, 2 g of calcium chloride, 1 g of hydrogen peroxide, and 1 g of polyvinyl pyrrolidone; and a displacement fluid: 3% potassium chloride solution.

The experimental results are shown in FIG. 1. After the rock plates are subjected to a phase-change fractured fracture conductivity experiment, the conductivity changes from initial 2.8 $\mu m^2 \cdot cm$ to 22.1 $\mu m^2 \cdot cm$, which indicates that the fracture supporting is successful through phase-change fracturing. At the same time, with the increase of a fracture closing pressure, the fracture conductivity has decreased, but it is still many times higher than the initial permeability. When the closing pressure reaches 60 MPa, the fracture conductivity is still 14.5 $\mu m^2 \cdot cm$, which indicates that the phase-change fracturing process provided by the present invention can meet the underground high pressure conditions. When the construction is completed, the phase-changed solid material achieves the supporting for the formation fracture.

The invention claimed is:

1. A phase-change hydraulic fracturing process, comprising the following steps:
    (1) injecting a fracturing fluid agent into a formation at a pressure higher than a formation fracturing pressure to generate a fracture in the formation, wherein the fracturing fluid agent is water or a first fracturing fluid, and the first fracturing fluid is a guar gum fracturing fluid, a cellulose fracturing fluid, or a polyacrylamide fracturing fluid;
    (2) placing a non-phase-change liquid and a solids-free phase-change liquid in different liquid mixing tanks respectively in a construction site, and injecting the non-phase-change liquid and the phase-change liquid to a shaft at the same time, wherein an injection volume ratio of the non-phase-change liquid to the phase-change liquid is in a range of (>0 to ≤0.7):(0.3 to 1); a total injection amount of the non-phase-change liquid and the phase-change liquid is calculated based on a geometric volume of a fracture design, and the phase-change liquid comprises a supramolecular construction unit and a supramolecular function unit, and the supramolecular construction unit is a triallyl isocyanurate;
    (3) injecting a displacement fluid into the shaft, and thereby the non-phase-change liquid and the phase-change liquid in the shaft completely enter a reservoir in the formation;
    (4) performing a well shut-in and pressure-out for 30 min to 200 min, and subjecting the phase-change liquid to a phase change to form a solid material that is laid in the fracture; and
    (5) relieving the pressure of the well.

2. The phase-change hydraulic fracturing process according to claim 1, wherein the non-phase-change liquid is a second fracturing fluid, seawater, formation water, or ground fresh water; wherein the phase-change liquid comprises the supramolecular construction unit in an amount of 10%-40% by weight, the supramolecular function unit in an amount of more than 0% up to 40% or less by weight, a surfactant in an amount of 0.5%-2% by weight, an inorganic salt in an amount of 0.5% by weight, an oxidizing agent in an amount of 0.5%-2% by weight, a cosolvent in an amount of 0.2% by weight and a solvent in a remaining percentage by weight;

wherein the supramolecular function unit is a vinyl acetate, an acrylonitrile, or a mixture of the vinyl acetate and the acrylonitrile; and wherein the solvent is a toluene, an ethyl benzene, an o-xylene, a m-xylene or a p-xylene.

3. The phase-change hydraulic fracturing process according to claim 2, wherein the surfactant is one or more selected from the group consisting of sodium dodecylbenzenesulfonate, and cetyl trimethylammonium bromide.

4. The phase-change hydraulic fracturing process according to claim 2, wherein the inorganic salt is one or more selected from the group consisting of sodium phosphate, calcium chloride, and magnesium chloride.

5. The phase-change hydraulic fracturing process according to claim 2, wherein the oxidizing agent is a hydrogen peroxide, an ammonium persulfate, or a sodium dichromate.

6. The phase-change hydraulic fracturing process according to claim 2, wherein the cosolvent is a polyethylene glycol, a polyvinyl pyrrolidone, or a mixture of the polyethylene glycol and the polyvinyl pyrrolidone.

7. The phase-change hydraulic fracturing process according to claim 1, wherein the displacement fluid is a diesel, a gasoline, an ammonium chloride solution of 3% by mass, or a potassium chloride solution of 3% by mass.

* * * * *